United States Patent
Choi et al.

(10) Patent No.: US 7,561,693 B2
(45) Date of Patent: Jul. 14, 2009

(54) METHOD FOR AUTOMATICALLY ENTERING INTO SECURE COMMUNICATION MODE IN WIRELESS COMMUNICATION TERMINAL

(75) Inventors: Kyoung Ho Choi, Kyoungki-do (KR); Kil Ho Lee, Kyoungki-do (KR); Moon Seob Song, Kyoungki-do (KR); Joon Woo Lee, Kyoungki-do (KR)

(73) Assignee: Pantech & Curitel Communications, Inc., Seoul (KR)

( * ) Notice: Subject to any disclaimer, the term of this patent is extended or adjusted under 35 U.S.C. 154(b) by 646 days.

(21) Appl. No.: 10/621,244

(22) Filed: Jul. 15, 2003

(65) Prior Publication Data

US 2004/0030885 A1    Feb. 12, 2004

(30) Foreign Application Priority Data

Aug. 7, 2002    (KR)    ............ 10-2002-0046599

(51) Int. Cl.
*H04L 9/00* (2006.01)
(52) U.S. Cl. .................................. 380/270
(58) Field of Classification Search ............ 380/41, 380/256–257, 261
See application file for complete search history.

(56) References Cited

U.S. PATENT DOCUMENTS

| | | | | |
|---|---|---|---|---|
| 5,615,266 | A * | 3/1997 | Altschuler et al. | 713/162 |
| 5,696,880 | A * | 12/1997 | Gustafson et al. | 704/273 |
| 5,778,073 | A | 7/1998 | Busching et al. | |
| 6,034,994 | A * | 3/2000 | Yoon | 375/242 |
| 6,044,158 | A * | 3/2000 | Terpening et al. | 380/255 |
| 6,266,412 | B1 | 7/2001 | Berenzweig et al. | |
| 6,295,302 | B1 | 9/2001 | Hellwig et al. | |
| 6,671,567 | B1 * | 12/2003 | Dwyer et al. | 700/94 |

(Continued)

FOREIGN PATENT DOCUMENTS

DE    3418571 A1    11/1984

(Continued)

OTHER PUBLICATIONS

"Specification of the Bluetooth System" V.1.0B: Kink Manager Protocol; Specification vol. 1; Nov. 1999; XP-002174828.

*Primary Examiner*—Gilberto Barron, Jr.
*Assistant Examiner*—Venkat Perungavoor
(74) *Attorney, Agent, or Firm*—H.C. Park & Associates, PLC

(57) ABSTRACT

Provided are a method for automatically entering into a secure communication mode that can perform secured voice communication between a transmission terminal and a reception terminal without changing or pre-setting a conventional wireless mobile communication system by forming part of a voice signal as a token for attempting secured voice communication, and a computer-readable recording medium for recording a program that implements the method. The method of the present research includes the steps of: a) generating a token based on a data having the lowest frequency of generation among the voice data outputted from a vocoder of the wireless communication terminal; b) at a transmission terminal receiving a request for a secure communication from a user and transmitting the token to a reception terminal; and c) at the transmission terminal entering into a secure communication mode based on an acknowledge token transmitted from the reception terminal, and performing secure communication with the reception terminal.

10 Claims, 3 Drawing Sheets

U.S. PATENT DOCUMENTS

| | | | |
|---|---|---|---|
| 6,889,321 B1 * | 5/2005 | Kung et al. | 713/153 |
| 7,133,696 B2 * | 11/2006 | Mauro, II | 455/560 |
| 7,164,755 B1 * | 1/2007 | Yokoyama | 379/88.07 |

FOREIGN PATENT DOCUMENTS

| | | |
|---|---|---|
| EP | 0641140 A2 | 3/1995 |
| EP | 1209845 A2 | 5/2002 |
| JP | 06-077952 | 3/1994 |
| JP | 2001-223689 | 8/2001 |
| KR | 1019990231159 | 8/1990 |
| KR | 97-19193 | 4/1997 |

\* cited by examiner

US 7,561,693 B2

METHOD FOR AUTOMATICALLY ENTERING INTO SECURE COMMUNICATION MODE IN WIRELESS COMMUNICATION TERMINAL

CROSS REFERENCE TO RELATED APPLICATION

This application claims priority from and the benefit of Korean Patent Application No. 10-2002-0046599, filed on August 7, 2002, which is hereby incorporated by reference for all purposes as if fully set forth herein.

FIELD OF THE INVENTION

The present invention relates to a wireless mobile communication terminal; and, more particularly, to a method for automatically entering into a secure communication mode to perform voice encryption between a transmission terminal and a reception terminal without changing or pre-setting a wireless mobile communication system, and a computer-readable recording medium for recording a program that can implement the method.

DESCRIPTION OF RELATED ART

One of known secure communication technologies in a wireless mobile communication system is a Data Encryption Standard (DES), which encrypts data using a private key. In DES, more than $72 \times 10^{15}$ private keys are used. Keys for each message are selected at random from the plenty of keys. Just as other private key encryption methods, both transmission and reception terminals should know and use the same private key. In the DES technology, 56 bits are used as a key in a 64-bit data block. This process can be performed in various modes, and it should go through 16 times of operations. DES was developed by IBM, and it is adopted as a Federal Standard in 1977. DES is in the American National Standards Institute (ANSI) X3.92 and X3.106 Standard and the Federal Information Processing Standards (FIPS) 46 and 81.

The conventional secure communication system, however, has a shortcoming that it necessarily needs a voice communication security device, i.e., an encryption device, to secure voice communication. The voice communication security device is a system only for protecting voice communication from wiretapping.

Another conventional technology for secure voice communication is an Authentication Voice Privacy technology. In this technology, a particular message for attempting secured voice communication is transmitted from a transmission terminal to a base station, and the base station transmits a message for authentication to a reception terminal to perform secured voice communication.

However, this technology, too, has problems that a particular message for secured voice communication should be pre-set in the communication system. Since the base station knows that the communication channel is established for secured voice communication, the communication channel can become an object to be attacked.

SUMMARY OF THE INVENTION

It is, therefore, an object of the present invention to provide a method for entering into a secure communication mode from a normal communication mode by forming part of a voice signal communicated between a transmission terminal and a reception terminal as a token for attempting secured voice communication without changing the conventional establishment of a wireless mobile communication system, and a computer-readable recording medium for recording a program that implements the method. Other object(s) and advantage(s) of the present invention could be understood to those ordinarily skilled in the art from the accompanying drawings, detailed description of the invention and claims.

In accordance with an aspect of the present invention, there is provided a method for automatically entering into a secure communication mode in a wireless communication terminal, including the steps of: a) generating a token based on a data having the lowest frequency of generation among the voice data outputted from a vocoder of the wireless communication terminal; b) at a transmission terminal receiving a request for a secure communication from a user and transmitting the token to a reception terminal; and c) at the transmission terminal entering into a secure communication mode based on an acknowledge token transmitted from the reception terminal, and performing secure communication with the reception terminal.

In accordance with another aspect of the present invention, there is provided a computer-readable recording medium for recording a program that implements a method for automatically entering into a secure communication mode in a wireless communication terminal provided with a processor, including the steps of: a) generating a token based on a data having the lowest frequency of generation among the voice data outputted from a vocoder of the wireless communication terminal; b) at a transmission terminal receiving a request for a secure communication from a user and transmitting the token to a reception terminal; and c) at the transmission terminal entering into a secure communication mode based on an acknowledge token transmitted from the reception terminal, and performing secure communication with the reception terminal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Figure 1:
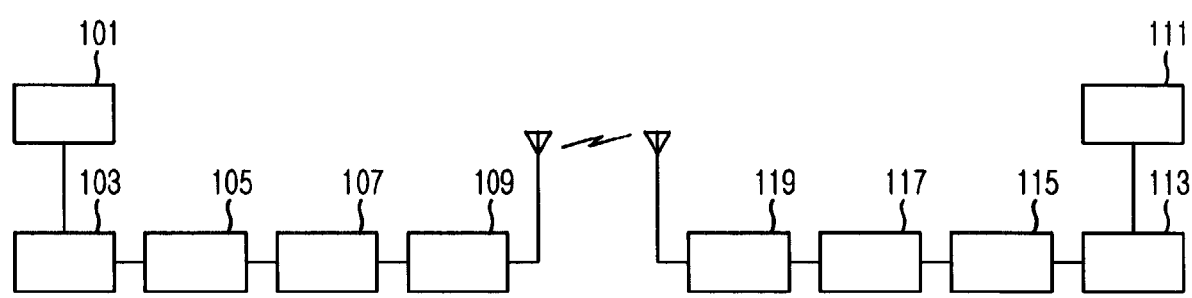
FIG. 1 is a block diagram showing a transmission terminal and a reception terminal of a wireless communication system in accordance with an embodiment of the present invention.

Other objects and aspects of the invention will become apparent from the following description of the embodiments with reference to the accompanying drawings, which is set forth hereinafter. Here, the same reference numeral is given to the same constituents, although they appear in different drawings. Also, if further detailed description on the related prior art is considered to blur the point of the present invention, it will be omitted.

FIG. 1 is a block diagram showing a transmission terminal and a reception terminal in a wireless communication system in accordance with an embodiment of the present invention. As shown in the drawing, the transmission terminal of the wireless communication system includes a microphone 101, a vocoder 103, a voice encryption unit 105, a channel encoding unit 107 and a spread/modulation unit 109. The reception terminal includes a speaker 111, a vocoder 113, a voice decryption unit 115, a channel decoding unit 117 and a dispreading/demodulation unit 119.

A voice signal of a user which is inputted to the microphone 101 of the transmission terminal goes into the vocoder 103 and is outputted in the form of 20 ms-based voice packet data. In accordance with the present invention, when the transmission terminal, i.e., a calling part, begins secure communication, a token for secure communication is generated in the voice encryption unit 105. The token is transmitted through a channel reserved for transmitting the 20 ms-based voice packet data. In short, if the user on the calling part attempts secured voice communication, the voice encryption unit 105 transmits the token to the reception terminal, i.e., a called part, through the voice channel. This way, secured voice communication can be achieved. The data format of the token is the same as that of the voice packet data. Therefore, the secured voice communication can be performed without setting the communication system additionally.

Meanwhile, since the voice data outputted from the vocoder 103 is composed of random data according to each voice signal, the token data should be able to be distinguished from the voice packet data. If the token data is not distinguished from the voice packet data, the reception terminal cannot tell whether the signal it received from the transmission terminal is a token data or voice packet data.

To make the token data distinguished from the voice packet data, data having the lowest frequency of generation are combined in an arbitrary length among the voice data outputted from the vocoder 103 and used as a header of the token. Hereinafter, the word "frequency" in "frequency of generation" and "generation frequency" is used synonymously as "occurrence." In short, among the voice data outputted from the vocoder 103, a data formed in a predetermined length, e.g., two bytes, and having the lowest generation frequency for a predetermined time, e.g., three hours, is stored as a header of the token (which is referred to as 'a token header') in the transmission and reception terminals. The first two bytes of the voice packet data, which is outputted from the vocoder 103, are stored for a predetermined time, and then two-byte data having the lowest frequency among the values of 0x000 0xFFFF are used as a token header.

To make much lower the probability that the token data is overlapped with the voice packet data, a data combination having the lowest generation frequency among the voice data which is outputted from the vocoder 103 and has more than two bytes, e.g., in case of a 8 Kbps EVRC vocoder 103, up to 22 bytes, can be used as a token header.

Desirably, the length of the token should be shorter than the maximum output length of the vocoder 103. If the token header is shorter than the maximum output data of the vocoder 103, the other portion of the token can be transmitted as a key value to be used in an encryption algorithm. Generally, the output data of the vocoder 103 have various lengths, such as full, half, quarter and eighth rates. However, in accordance with the present invention, it is desirable to set the length of the output data at a full rate during generation of the token. This is because the maximum output length of the vocoder 103 can be secured and the length of a token header can have a wider range of selection.

The longer the maximum output data of the vocoder 103 is, the longer the token becomes. Therefore, information other than the token header can be transmitted along the token data. For example, in a data encryption standard exclusive-ORed (DESX) technology, master and session keys are used to perform secured voice communication. The same master key is used for both transmission and reception terminals, and the session key has an arbitrary value that is generated by using the master key. In accordance with the present invention, if a session key generated in the transmission terminal is included in the token as information other than the token header, the reception terminal compares the session key transmitted from the transmission terminal with the session key generated by using the master key included in the reception terminal (to see if the keys are matched), and determines whether to enter into the secure communication mode or not.

The voice decryption unit 115 of the reception terminal determines if the data transmitted from the transmission terminal are token data or not. Here, the voice encryption unit 105 of the transmission terminal transmits the same token data repeatedly a predetermined times (for example, 240 20 ms-unit frames are transmitted repeatedly for a 4.8 seconds), and if the reception terminal receives the same data considered to be token data including the token header, which is described above, repeatedly a predetermined times (for example, the identical data of a 20 ms-unit frame is received three times), it concludes that the transmission terminal has attempted the secured voice communication. Accordingly, the reception terminal generates an acknowledge token and transmits the acknowledge token to the transmission terminal.

The acknowledge token is generated and transmitted in the same method as the token in the transmission terminal. At this time, the acknowledge token header is the same as or different from the token header. After the acknowledge token is transmitted, the transmission and reception terminals enter into the secure communication mode and perform secured voice communication. Here, the above mentioned process of determining if keys are matched should be understood to be included in the process of determining if the transmission terminal is attempting secured voice communication.

Figure 2A:
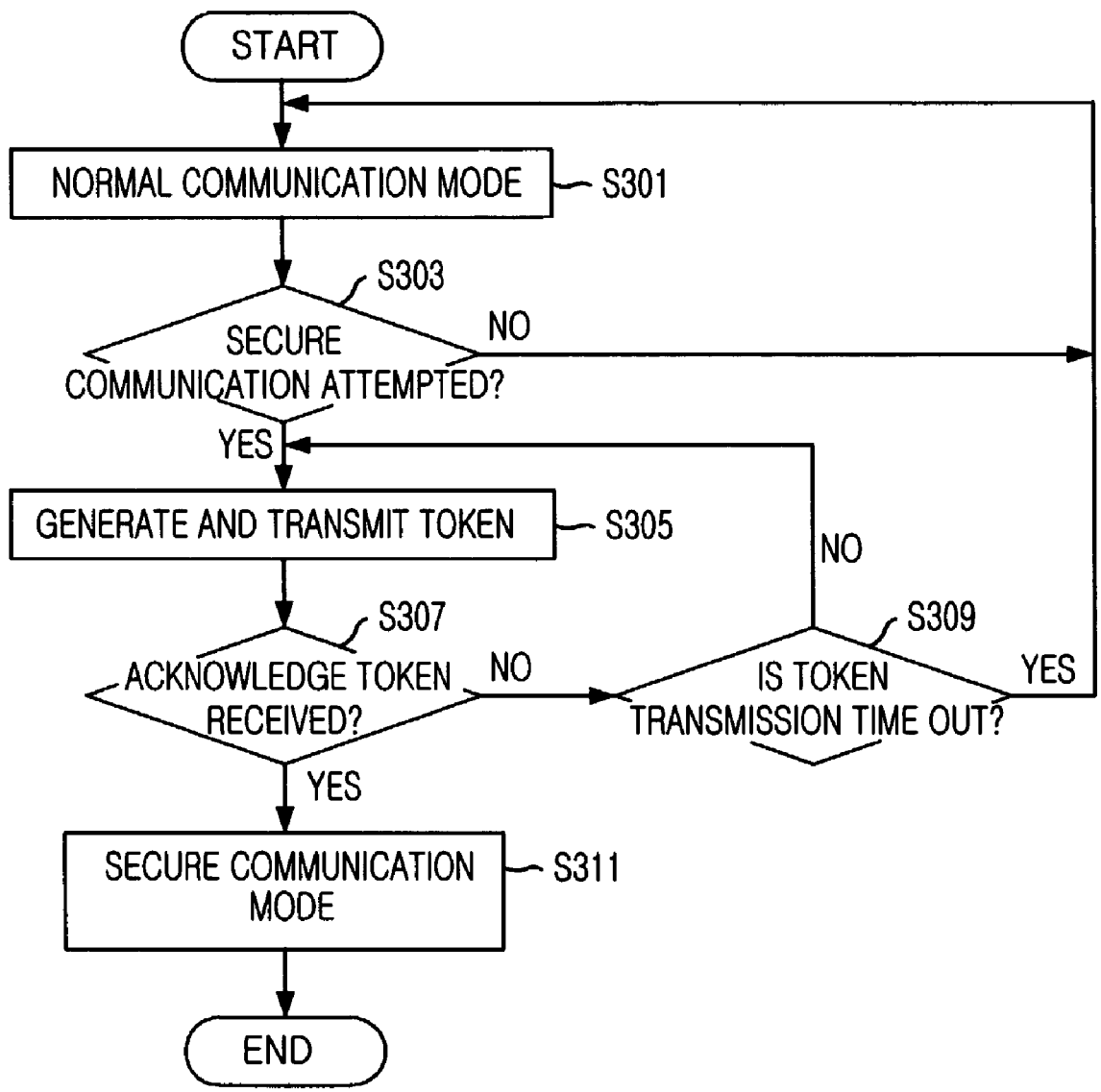
FIG. 2A is a flow chart describing a transmission terminal entering into a secure communication mode in accordance with an embodiment of the present invention.
Figure 2B:
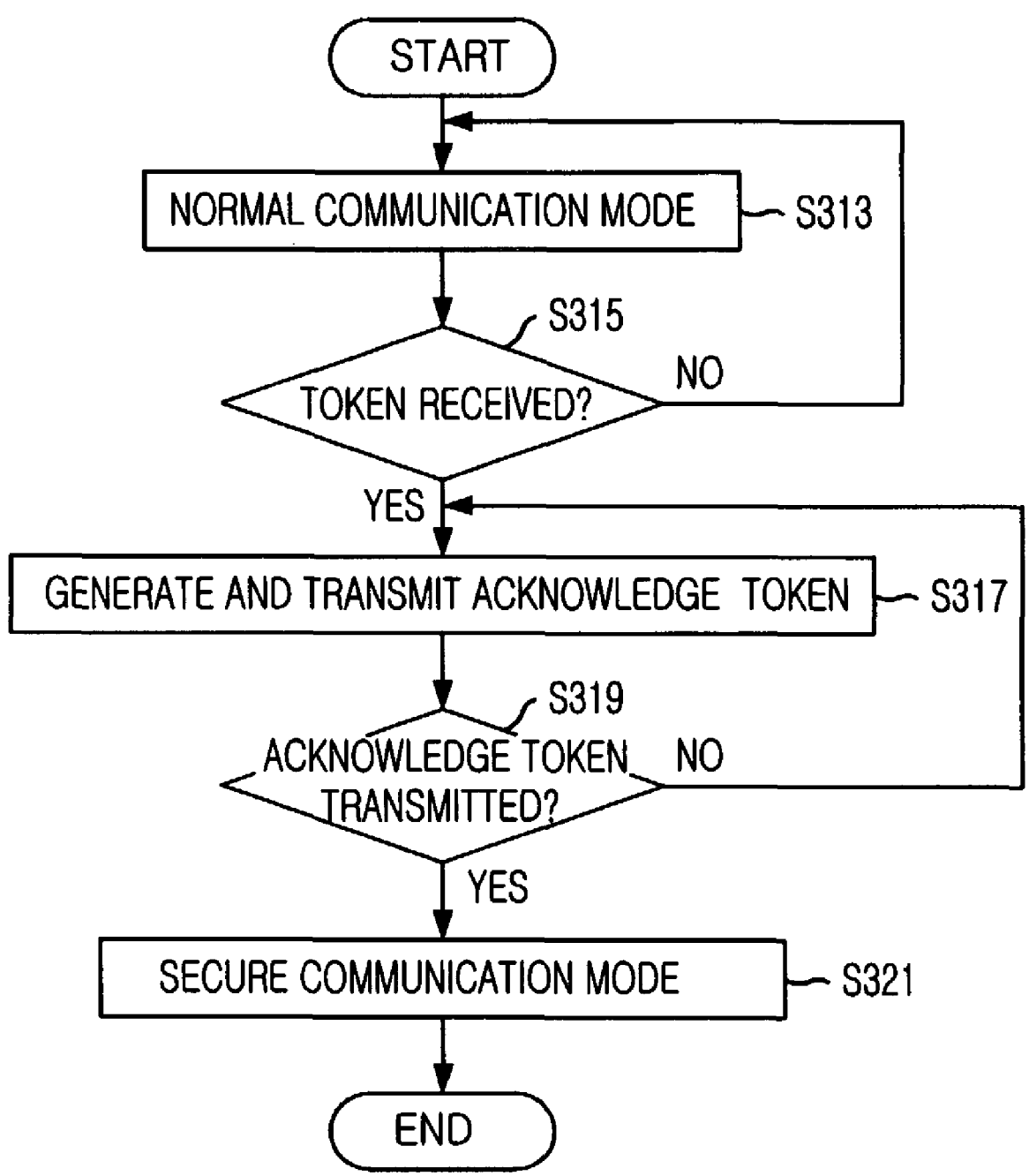
FIG. 2B is a flow chart illustrating a reception terminal entering into a secure communication mode in accordance with an embodiment of the present invention.

FIG. 2A is a flow chart describing a transmission terminal entering into the secure communication mode, and FIG. 2B is a flow chart illustrating a reception terminal entering into the secure communication mode in accordance with an embodiment of the present invention.

At step S301, the transmission terminal is at a normal communication mode. Then, at step S303, it determines if a request for attempting secured voice communication is inputted by a user. If a request for attempting secured voice communication is inputted by a user, at step S305, the voice encryption unit 105 generates a token data based on a pre-stored token header and transmits it to the reception terminal, which is also described above.

Here, the voice encryption unit 105 transmits the same token data repeatedly a predetermined times (for example, 240 20 ms-unit frames are transmitted repeatedly for 4.8 seconds), and if the reception terminal receives the same data repeatedly a predetermined times (for example, the identical data of a 20 ms-unit frame are received three times), it recognizes that the transmission terminal has attempted secured voice communication. The transmission terminal sets up the temporal length of the token data, it has transmitted repeatedly (for example, in case of 240 20 ms-unit frames are transmitted repeatedly, 4.8 seconds) as a token transmission time for transmitting the token. Then, at steps S307 and S309, it determines whether an acknowledge token is transmitted from the reception terminal during the token transmission time, which is set up from the beginning point of token data transmission.

If the acknowledge token is not received during the token transmission time, the transmission terminal continues to generate the token data and transmit them to the reception terminal. While checking out whether the acknowledge token is received continuously, if the token transmission time is out, the logic goes to the step S301 and the transmission terminal maintains the normal communication mode. If the transmission terminal receives an acknowledge token, at step S311, it enters into the secure communication mode, because the transmission of the acknowledge token means that the reception terminal has entered into the secure communication mode.

Meanwhile, at step S313, the reception terminal remains in a normal communication mode. Then, at step S315, it determines whether token data for secured voice communication are transmitted from the transmission terminal. If a token data for secured voice communication is transmitted from the transmission terminal, at step S317, the voice decryption unit 115 generates an acknowledge token in response to the token for secured voice communication and transmits the acknowledge token to the transmission terminal. The acknowledge token data is generated based on a pre-stored acknowledge token header, and transmitted to the transmission terminal.

Here, at step S319, the voice decryption unit 115 transmits the same acknowledge token data repeatedly a predetermined times. At steps S307 and S309, the transmission terminal sets up the temporal length of the token data it transmitted repeatedly at step S305, for example, in case where 240 20 ms-unit frames are transmitted repeatedly, the temporal length is 4.8 seconds, as a token transmission time. Then, at steps S307 and S309, it determines whether an acknowledge token is transmitted from the reception terminal during the token transmission time, which is set up from the beginning time of the token data transmission. If an acknowledge token is received, at step S311, the transmission terminal enters into the secure communication mode, just as described before. After the step S319, the reception terminal enters into the secure communication mode from the normal communication mode.

The method of the present invention can be embodied as a program and stored in a computer-readable recording medium, such as CD-ROMs, RAMS, ROMs, floppy disks, hard disks, optical-magnetic disks and the like.

The method of the present invention eliminates the need of transmitting additional messages or signals for entering into the secure communication mode by analyzing the voice signals of the transmission and reception terminals and using the data having the lowest frequency of use as a token data. Since no additional messages are needed, secured voice communication can be performed without a change in the conventional mobile communication system establishment.

While the present invention has been described with respect to certain preferred embodiments, it will be apparent to those skilled in the art that various changes and modifications may be made without departing from the scope of the invention as defined in the following claims.

What is claimed is:

1. A method for automatically entering into a secure communication mode in a wireless communication terminal, comprising the steps of:
    a) storing a voice signal outputted from a vocoder of the wireless communication terminal for a predetermined time;
    b) selecting at least one of the voice signal values among which the occurrence of generation is lower than a threshold value to generate a token header data;
    c) combining token header data of variable lengths to form a token header and generating a token including the token header, the token header data having the lowest occurrence of generation among voice data outputted from the vocoder of the wireless communication terminal;
    d) at a transmission terminal, receiving a request for a secure communication from a user and transmitting the token to a reception terminal; and
    e) at the transmission terminal, entering into a secure communication mode based on an acknowledge token received from the reception terminal, and performing secure communication with the reception terminal.

2. The method as recited in claim 1, wherein the token includes a data having the lowest generation occurrence among the data of voice packet data outputted from the vocoder as a token header.

3. The method as recited in claim 1, wherein the token is shorter than the maximum length of the voice data outputted from the vocoder.

4. The method as recited in claim 3, wherein the token includes a key used in an encryption algorithm for the secure communication.

5. The method as recited in claim 1, wherein in the step d), the token is transmitted repeatedly a predetermined number of times.

6. The method as recited in claim 5, wherein in the step d), the repeated transmission of the token stops when the acknowledge token from the reception terminal is received.

7. The method as recited in claim 1, further comprising the steps of:
    f) at the reception terminal, receiving the token transmitted from the transmission terminal, and transmitting a token formed in accordance with the step c) as the acknowledge token to the transmission terminal; and
    g) at the reception terminal, entering into the secure communication mode and performing secure communication with the transmission terminal.

8. The method as recited in claim 7, wherein the step f) includes the step of:
    h) comparing a session key generated in the transmission terminal and included in the token with a session key generated in the reception terminal using a master key.

9. A computer-readable recording medium for recording a program that implements a method for automatically entering into a secure communication mode in a wireless communication terminal provided with a processor, comprising the steps of:
    a) combining token header data of variable lengths to form a token header and generating a token including the token header, the token header data having the lowest occurrence of generation among voice data outputted from a vocoder of the wireless communication terminal;
    b) at a transmission terminal, receiving a request for a secure communication from a user and transmitting the token to a reception terminal; and
    c) at the transmission terminal, entering into a secure communication mode based on an acknowledge token received from the reception terminal, and performing secure communication with the reception terminal.

10. The method of claim 1, further comprising:
    combining the token header data to form the token header of a predetermined length.

* * * * *